United States Patent [19]

Heredia

[11] 4,369,551
[45] Jan. 25, 1983

[54] QUICK RELEASE DEVICE FOR FISHING LEADER LINES

[76] Inventor: Juan Heredia, 2711 SW. 93rd Ct., Miami, Fla. 33165

[21] Appl. No.: 262,229

[22] Filed: May 11, 1981

[51] Int. Cl.³ .............................................. A44B 17/00
[52] U.S. Cl. ................................................. 24/201 A
[58] Field of Search ................ 24/230, 201 A, 201 R; 43/44.98

[56] References Cited

U.S. PATENT DOCUMENTS

| 867,162 | 9/1907 | Seidl | 24/201 R |
|---|---|---|---|
| 2,150,074 | 3/1939 | McLure | 43/44.98 |
| 3,169,817 | 2/1965 | McKee | 24/230 R |
| 3,816,954 | 6/1974 | Bissonette | 24/201 A |
| 3,861,814 | 1/1975 | Fisher | 43/44.98 |
| 3,983,657 | 10/1976 | Klein | 43/44.98 |
| 4,184,232 | 1/1980 | Marosy | 24/201 |

Primary Examiner—Gene Mancene
Assistant Examiner—Wenceslao J. Contreras
Attorney, Agent, or Firm—Jesus Sanchelima

[57] ABSTRACT

A quick release device for fishing leader lines comprising a slotted swivel body member that is tied to the fishing line and a T-shape pin, receivable in one end of said slotted swivel member tied to said leader line which usually carries a hook, bait, etc. The T-shape pin is prevented from falling off the slotted swivel member by a slideable ring inserted over and around said swivel member. The other end of said slotted swivel member is provided with a longitudinal axial aperture and a headed formed pin being journalled in said aperture. The other end of the pin having an eye termination to which the main fishing line is tied.

3 Claims, 7 Drawing Figures

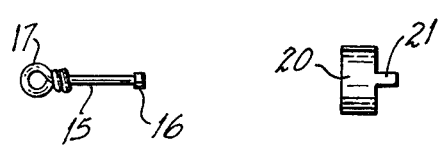
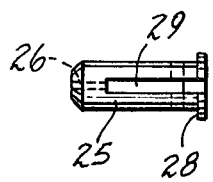
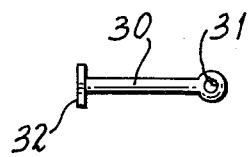
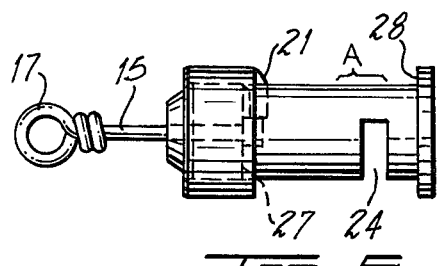
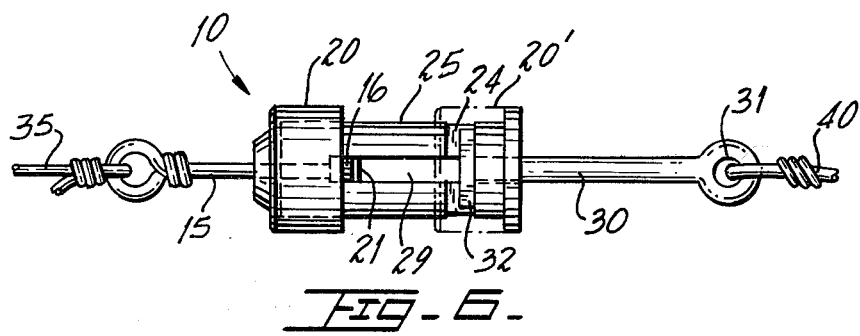
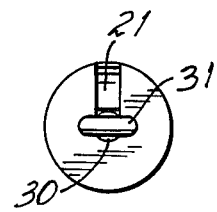

QUICK RELEASE DEVICE FOR FISHING LEADER LINES

BACKGROUND OF THE INVENTION

1. Field of the Invention

The present invention relates to a device for quickly releasing fishing leader lines from the end of a fishing line.

2. Description of the Prior Art

Several attempts have been made to provide a device for attaching and detaching a fishing leader to the end of a fishing line. Specifically, one of these attempts is disclosed in U.S. Pat. No. 3,148,423 issued to Anspack. The problem with this device, however, is that it relies on a constant pull from the leader line to maintain the connector engaged. If a change of current or any other movement, occurs, then, it is obvious from its construction that this device will disengage as easily as it was engaged through the slot 6, thereby making it an unreliable fishing device.

Other patents describing the closest subject matter provide for a number of more or less complicated features that fail to solve the problem in an efficient and economical way. None of these patents suggest the novel features of the present invention.

SUMMARY OF THE INVENTION

It is the main purpose of the present invention to provide a fishing device capable of quickly releasing the leader line from the main fishing line in order to minimize the time spent by the user disengaging the hook from the fish and postpone this task to a later time.

It is another object of the present invention to provide a device of the class described which functions easily under unfavorable conditions and that allows the user to operate it principally through the feeling of the component elements. Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 shows a formed swivel pin.

FIG. 2 illustrates a side view of the locking ring.

FIG. 3 is a side view of the main swivel body member showing its partial longitudinal slot.

FIG. 4 shows the T-shape pin which is provided with an eye termination to which the leader line is connected.

FIG. 5 is a side view of the device, with all of its elements assembled with the exceptionof the T-shape pin.

FIG. 6 is a side view of the device completely assembled and showing the locking ring in solid, as in FIG. 5, and in phantom, which corresponds to the locking position.

FIG. 7 is an end view of FIG. 6.

DESCRIPTION OF THE PREFERRED EMBODIMENT

Referring more particularly to the drawings, FIGS. 1, 2, 3, and 4 illustrate the individual components of the present invention, which is referred to in general as quick release device 10 in FIG. 6. FIG. 1 shows swivel pin 15 which is formed from a wire having a headed termination 16 on one end and the other end, being originally straight, is inserted through aperture 26 of main swivel body member 25. Once said straight end is inserted, a looped termination 17 is formed, as shown in FIGS. 1, 5 and 6. Headed termination 16 of pin 15 comes in contact with internal wall 27 inside the swivel body member 25, thereby preventing pin 15 from slipping out. FIG. 2 shows locking ring 20 which is provided with guiding tongue 21. Said guiding tongue 21 extends axially originally and it is bent inwardly after the main swivel body member is inserted through said ring 20, as shown in FIGS. 5 and 6. Once tongue 21 is bent, it prevents swivel body member 25 from slipping out since said tongue 21, which is inserted inside partially longitudinal through slot 29, comes in contact with internal wall 27 when the ring slides to one end. The other end of swivel body member 25 is provided with recess 28 which is of a large enough size as to prevent said ring 20 from sliding out. Locking ring 20 is shown in FIG. 6 in solid 20 and in phantom 20', representing the unlocking and locked position, respectively. It can be seen that in the locked position ring 20' comes in contact with recess 28 which prevents it from slipping out.

The partially longitudinal through slot 29 in swivel body member 25 has a uniform width along its length to fittingly receive guiding tongue 21, except in the area A, FIG. 5, adjacent to recess 28 where slot 29 is slightly narrower so as to require an additional and concrentious force to slide tongue 21 past this area A and prevent ring 20 from moving back to the unlocked position 20'.

FIG. 4 shows T-shape pin 30 having an eye termination 31 on one end and a T-shape termination 32 on the other end. Leader line 40 is tied to eye termination 31 so that when a fish is caught and brought aboard, the user only needs to release T-shape pin 30 from the main swivel body member 25 by sliding locking ring 20 to its unlocked position 20. Pin 30 is engaged to body member 25 by inserting the T-shape termination 32 through longitudinal slot 29 from the side of said body member 25 opposite to the side where radial slot 24 is located. For insertion of the T-shape termination, of course, it must be aligned with longitudinal slot 29 and once inserted, pin 30 is rotated one quarter of a turn so that said T-shape termination 32 can be positioned inside radial slot 24, as shown in FIG. 6. Finally, the main body member 25 and locking ring 20 is slid to the locked position thereby fully enclosing said T-shape termination 32.

To use device 10, the user prepares several leader lines 40 each provided with a T-shape pin 30 on one end and a hook, plus whatever else he desires, on the other end of said leader line 40. This is usually done before going fishing in order to minimize time spent in preparatory tasks and maximize the effective fishing time. When the fisherman is ready to throw his line, he simply takes one of these already prepared leader lines 40 by the end that has T-shape pin 30 tied to it and aligns the T-shape termination 32 with longitudinal slot 29 in a main swivel body member 25 that is permanently tied to the end of main fishing line 35, as described above. Locking ring 20 will have to be in position 20', unlocked position, so that pin 30 can be inserted from the side opposite to where radial slot 24 is and T-shape termination 32 has to protrude slightly past the outer surface of main swivel body member 25 so that the user may then rotate pin 30 and align now said T-shape termination 32 with radial slot 24. Once aligned, pin 30 is pulled back out enough so that T-shape termination 32 is inside swivel body member 25, housed within said radial slot 24. Pin 30 is then rotated so that it is longitudinally aligned with the longitudinal axis of swivel body member 25, as shown in FIG. 6. Locking ring 20 is then slid from unlocked position 20, thereby completely enclosing said T-shape termination 32 preventing it from falling off.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A quick release device for attaching and detaching a fishing line to a leader line, comprising:
   (a) a swivel body member of substantially tubular shape provided with a partially longitudinal through slot having an axial aperture extending longitudinally from the inner end of said slot to the end of said swivel body member and the other end being provided with a built-in recess and a radial slot relatively adjacent to said recess;
   (b) a swivel pin partially housed within said aperture and tied to said fishing line;
   (c) a T-shape pin having an eye termination on one end that is connected to said leader line and a T-shape termination on the other end that is removably positioned inside said radial slot, and
   (d) means for locking said T-shape pin in place.

2. The device set forth in claim 1 wherein said means for locking said T-shape pin in place comprises a locking ring provided with a guiding tongue extending radially inside said longitudinal through slot.

3. The device set forth in claim 1 wherein said longitudinal through slot in said swivel body member has a narrower width in the area relatively adjacent to said recess so as to require an additional force to be applied to said ring to slide passed said area.

* * * * *